June 10, 1930. N. C. PICKARD 1,762,240
AUTOMATIC UNLOADING DEVICE FOR VEHICLES
Filed Feb. 23, 1929 4 Sheets-Sheet 3

June 10, 1930.  N. C. PICKARD  1,762,240
AUTOMATIC UNLOADING DEVICE FOR VEHICLES
Filed Feb. 23, 1929  4 Sheets-Sheet 4

Inventor
Nathan C. Pickard.
By A. J. O'Brien
Attorney

Patented June 10, 1930

1,762,240

UNITED STATES PATENT OFFICE

NATHAN C. PICKARD, OF COLORADO SPRINGS, COLORADO

AUTOMATIC UNLOADING DEVICE FOR VEHICLES

Application filed February 23, 1929. Serial No. 341,896.

This invention relates to improvements in trucks provided with means for unloading the material by means of power obtained from the truck engine.

In transporting loose material such as coal, sand, gravel and grain, or similar materials, it is customary to load these materials into a box for transportation. Unless some special means is provided for unloading the box by means of power, it is necessary to employ shovels and to unload the box by manual labor.

It is the object of this invention to produce a truck which shall be so constructed that it shall be especially well adapted for use in connection with the transportation of coal or any of the other materials mentioned above and which shall be provided with means operated by the truck engine for unloading and for conveying the material to the place where it is to be stored. This invention, briefly described, comprises a truck having an engine and provided with a box of the proper capacity. The bottom of the box is provided with an opening near the rear end thereof, which opening can be closed by means of four doors hingedly connected to the sides of the opening and which can be moved into open or closed position by means of a lever accessible from the outside of the truck body. A conveyor is located underneath the box and has a portion thereof located directly beneath the opening so that material falling through the opening will be deposited on the conveyor. A scraper is provided which rests on the bottom of the box and extends the entire distance across the box from one side thereof to the other. This scraper is slidable along the bottom of the box and normally occupies a position near the front end of the box. Means is interposed between the scraper and the engine for moving the scraper in either direction longitudinally of the box and means interposed between the conveyor and the engine for operating the conveyor whenever the scraper is operated. The conveyor is secured to the box in such a manner that it can be rotated in a plane parallel with the bottom of the box through an angle of substantially one hundred eighty degrees. Means is also provided for automatically disconnecting the scraper moving mechanism whenever the scraper approaches its limit of travel in either direction.

Having thus briefly described the invention, the same will now be described in detail and reference for this purpose will be had to the accompanying drawings, in which the preferred embodiment thereof has been illustrated, and in which.

Figures 1, 12:
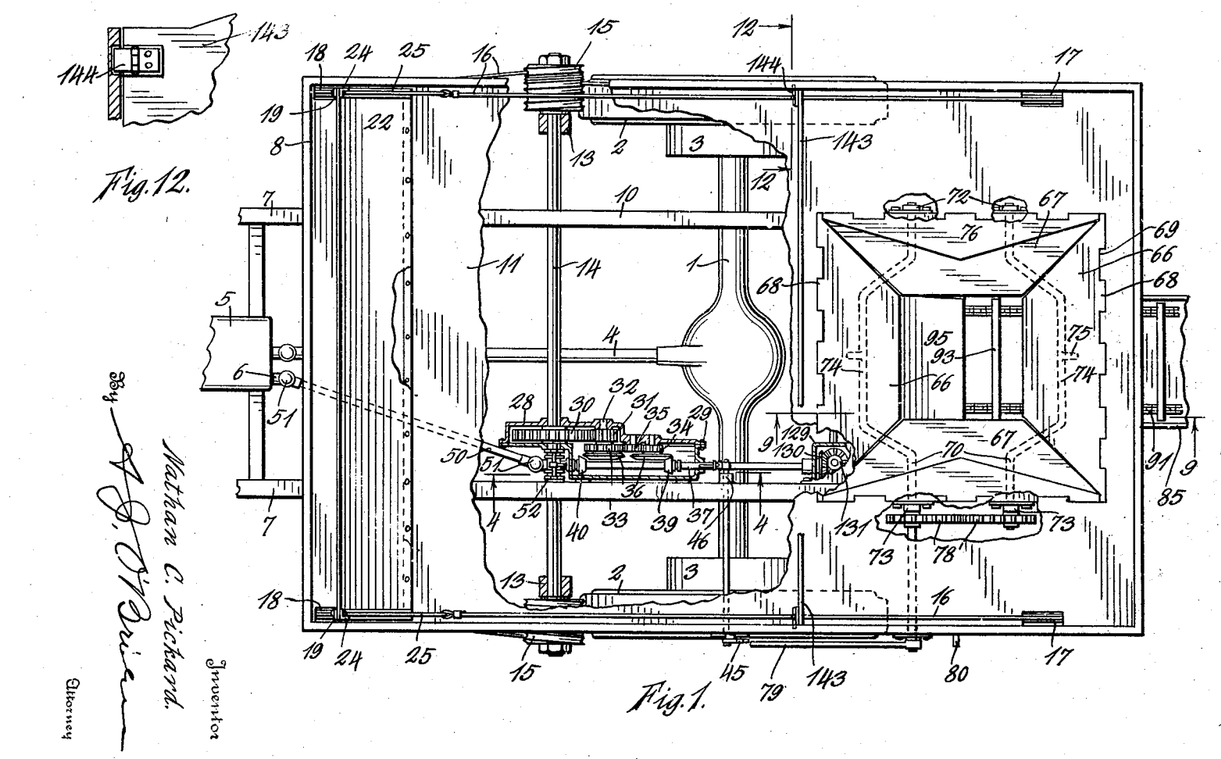
Fig. 1 is a top plan view of the box, portions thereof being broken away to better disclose the mechanism and to show its relationship to the body of the truck.
Fig. 12 is a view taken on line 12—12 Fig. 1.
Figures 2, 3, 13:
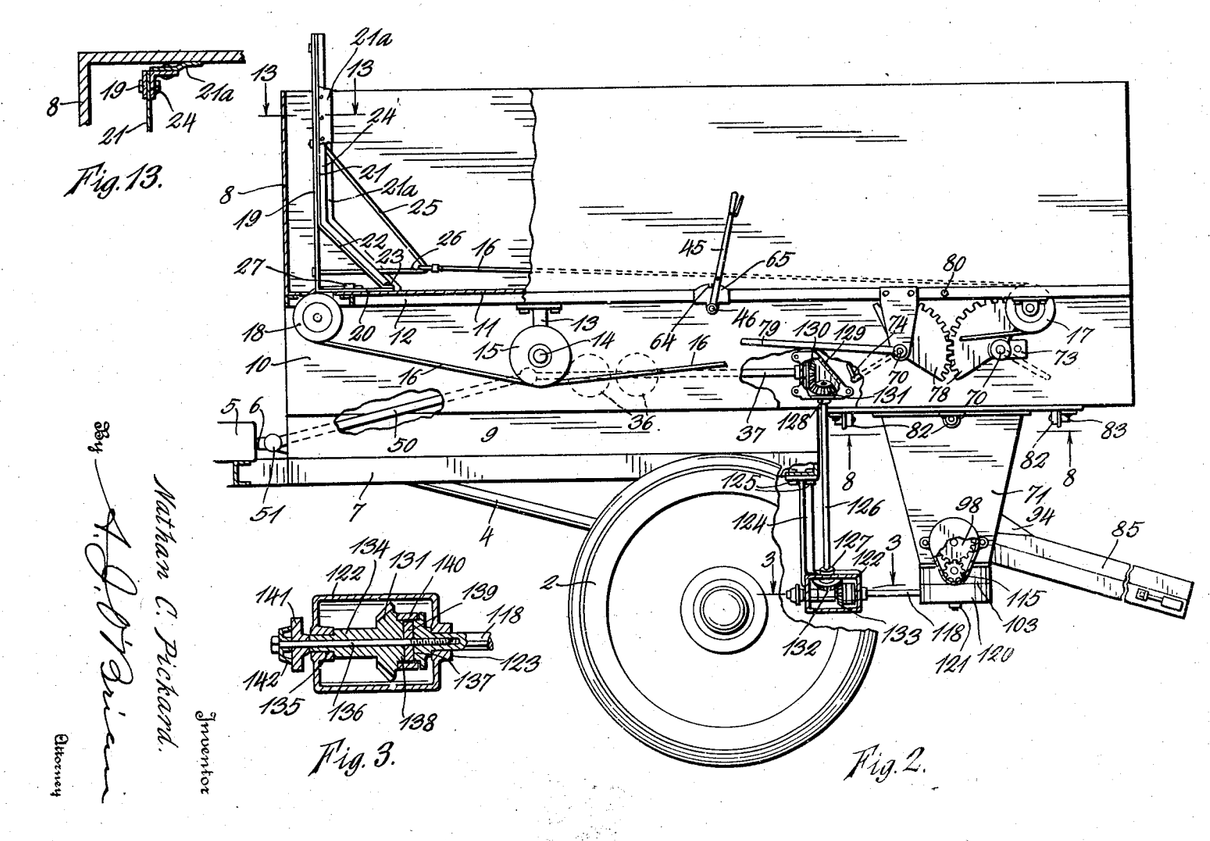
Fig. 2 is a side elevation of the rear portion of the truck, with parts thereof broken away.
Fig. 3 is a section taken on line 3—3, Fig. 2 and shows a friction clutch which is interposed between the conveyor and the source of power.
Fig. 13 is a section taken on line 13—13, Fig. 2.
Figure 4:
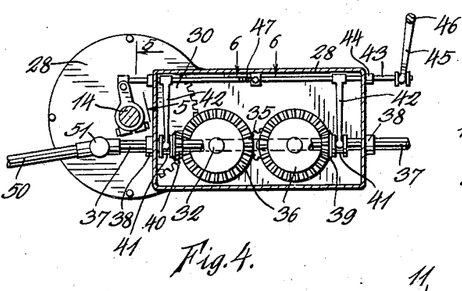
Fig. 4 is a section taken on line 4—4, Fig. 1, and shows the reversing gears and the means for operating the same.
Figure 6:
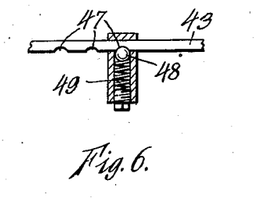
Fig. 6 is a section taken on line 6—6, Fig. 4, and shows a spring pressed detent which is employed for the purpose of properly positioning the gears of the reversing device.

Numeral 1 designates the rear axle housing of the truck to the outer ends of which the drive wheels 2 are secured. These wheels are provided with brakes 3 in the ordinary manner. Numeral 4 designates the drive shaft and numeral 5 designates the transmission which is also provided with an auxiliary power take-off 6 that can be controlled by a suitable lever not shown. A chassis frame which has been designated by numeral 7 is supported from the rear axle by means of springs in the usual manner. Supported on the chassis frame is a box which has been indicated as a whole by reference numeral 8 and which is separated from the upper surface of the chassis frame by supporting bars 9 and 10 which are preferably located directly above the frame members 7. The box is provided with a bottom 11 which is supported by a suitable angle iron frame 12. Secured to the under surface of the box are brackets 13 in which is rotatably mounted a shaft 14 whose ends are provided with drums 15. These drums are preferably grooved spirally for the reception of the steel cables 16. Located at the front and rear of the box are pulleys 17 and 18, the pulleys located at the rear being indicated by reference numeral 17 and those at the front end by reference numeral 18. A scraper extends transversely of the box from one side to the other and is formed from a frame comprising spaced L-shaped members 19 whose base portions 20 extend at right angles to the vertical portions and rest upon the upper surface of the bottom. A plate 21 is secured to the frame members 19 and has an inclined portion 22 whose lower edge is secured to the front ends of the horizontal portions 20 as indicated at 23. The ends of the plate 21 are reenforced by means of angles 24. A bar having two angularly related sides 25 and 26 is secured to each end of the scraper and forms means for securing the cable 16 to the scraper, all as shown in Figs. 1 and 2. It is now apparent that as shaft 14 is rotated, in a clockwise direction (Fig. 2), the scraper will be moved rearwardly along the inside of the box. The other ends of cables 16 are secured to the frame of the scraper by means of clamps 27 and therefore the scraper can be moved in either direction, depending on the direction in which shaft 14 is rotated. For the purpose of rotating the shaft 14 and moving the scraper by power derived from the motor of the truck, a gear transmission has been provided which will now be described. This gear transmission is enclosed in a housing 28 which is made in two parts and so constructed that it may be separated along a plane 29 in the manner shown. A gear 30 is secured to the shaft 14 and this cooperates with a pinion 31 that is secured to the stub shaft 32. This shaft also carries a gear 33 which is separated from a similar but smaller gear 34 by means of an idler 35. Bevelled gears 36 are secured to the same shafts that carry the gears 33 and 34, all as shown in Fig. 1. A shaft 37 is rotatably mounted in bearings 38 in the ends of the casing 28 and this shaft carries two bevelled pinions 39 and 40, which are slidably but nonrotatably secured to the shaft. The hubs of pinions 39 and 40 are each provided with a groove 41 which is adapted to cooperate with the fingers 42 on the shifting levers which are connected with the bar 43. This bar extends through the gear casings and is slidably supported in the bearings 44. The lower end of a lever 45 is connected with one end of bar 44 and as this lever can be oscillated about a pivot 46, it serves as a means for shifting the bar 43 longitudinally. In Fig. 6 a detent mechanism has been illustrated and from this it will be seen that bar 43 is provided with three depressions 47 which are adapted to be engaged by the ball 48 which is forced towards the bar by means of a spring 49. When the ball detent is in the central notch, pinions 40 and 39 are both out of gear and this is therefore the neutral position. When the rod 43 is moved towards the left, Fig. 4, pinion 39 will be moved into mesh with the corresponding gear 36, and if the rod 43 is moved towards the right, it will disconnect the pinion 39 and connect pinion 40 with the corresponding gear 36. The transmission gear is so arranged that it will cause shaft 14 to rotate in one direction when pinion 39 is in mesh with one of the gear wheels 36 and in the other direction when pinion 40 is in mesh with its gear 36. By having gear wheel 34 smaller than gear 33, a speed reduction is obtained when pinion 39 is operative and this is therefore the gear which is employed for moving the scraper rearwardly as force instead of speed is desired for unloading but when the scraper is moved from the rear of the box towards the front end thereof, pinion 40 is put into operation, thereby increasing the speed at which the scraper moves towards inoperative position. Shaft 37 is rotated from the power take-offs 6 by means of a shaft 50 which is provided with two universals 51. The power may, of course, be transmitted from the take-off to the shaft 37 by any other suitable means, but the one shown and described is considered to be preferable on account of its great simplicity.

Figure 5:
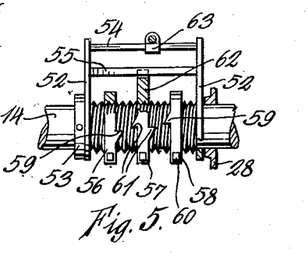
Fig. 5 is a view taken along line 5—5, Fig. 4, and shows the limit stop for disconnecting the scraper moving mechanism when the scraper reaches the limit of its travel in either direction.

It is evident that unless some means is provided for moving pinions 39 and 40 to neutral position when the scraper reaches its limit of travel in either direction that breaking strains will be produced when the scraper has reached either the most forwardly or most rearwardly position. For the purpose of automatically moving the gears to neutral position a limit control mechanism has been provided which will now be described. This control mechanism comprises a yoke member having two end members 52 that are rotatably connected with shaft 14 and held in place thereon by means of a collar 53 which prevents longitudinal movement in one direction; while longitudinal movement in the opposite direction is prevented by the casing 28. That portion of the shaft located between the end members 52 is threaded as shown in Fig. 5. End members 52 are connected by means of bars 54 and 55 in the manner shown in Fig. 5. Secured to the threaded portion of the shaft are three nuts which have been designated by reference numerals 56, 57 and 58. Nuts 56 and 58 are each provided on one side with a tooth 59 and are split and have their split ends connected by means of a bolt 60. These nuts can be adjusted longitudinally by rotating them relative to the shaft and may then be clamped in adjusted position by means of the bolts 60. The nut 57 is provided on opposite sides with a tooth 61 and has a radial extension 62 whose outer end is provided with a notch which embraces the bar 55. Nut 57 may be split like the other nuts but this is merely for the purpose of compensating for wear as it must never be clamped so as to prevent rotation but on the other hand must be free to rotate with respect to the shaft. Bar 43 is provided at one end with a member 63 that engages the bar 54 so that when the yoke formed by end members 52 is rotated about the axis of shaft 14, bar 43 will be reciprocated. It is evident that if shaft 14 rotates in either direction, that the nut 57 will be moved longitudinally in a direction depending on the direction in which the shaft rotates for the reason that nut 57 is held against rotation by the rod 55. As nut 57 approaches either one of nuts 56 or 58, one of its teeth 61 will be moved into the path of one of the teeth 59 and as soon as this occurs, nut 57 will rotate and move the yoke member thereby shifting the bar 43 longitudinally so as to disconnect the pinion 39 or 40 as the case may be so as to bring the gears into neutral position. As soon as the operative pinion has been disconnected, shaft 14 will immediately stop as the parts have very little momentum and a large amount of friction and will therefore not continue to move after the gears have been moved to neutral position. The gears will be held in neutral position by means of the detent shown in Fig. 6. After the limit device is operated the direction of rotation of shaft 14 must, of course, be reversed before it can be made to rotate farther. Lever 45 is preferably provided with a spring pressed pawl which engages in a notch 64 in a quadrant 65 when the gears are in neutral position.

Figure 7:
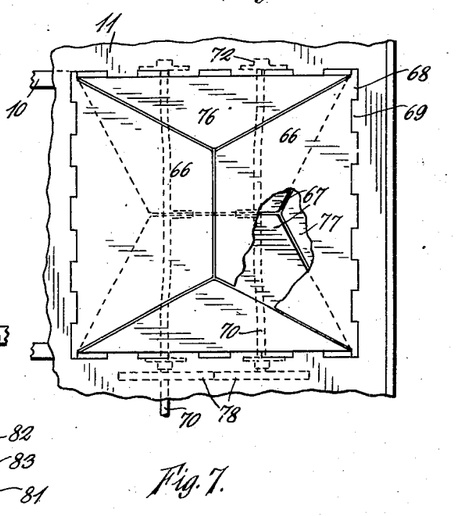
Fig. 7 is a top plan view showing the doors in opening closing position, portions being broken away to better disclose the construction.
Figure 8:
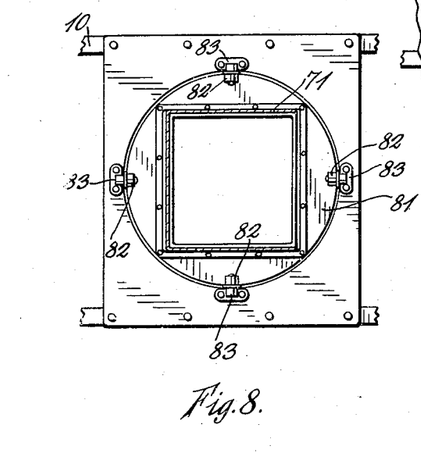
Fig. 8 is a view taken along plane 8—8, Fig. 2, and shows the manner in which the conveyor supporting chute is secured to the bottom of the box.
Figures 9, 11:
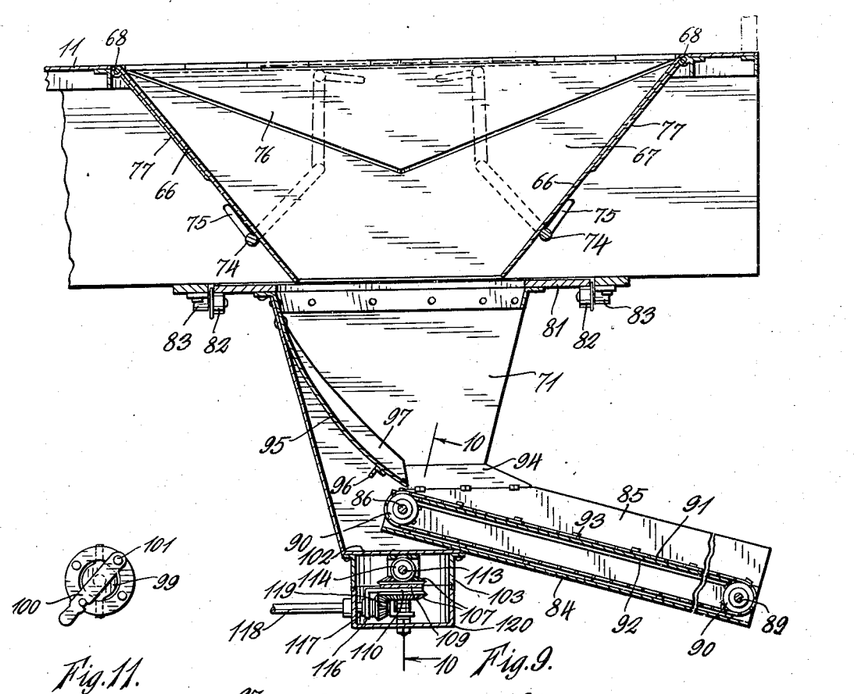
Fig. 9 is a section taken on line 9—9, Fig. 1.
Fig. 11 is a view looking in the direction of arrow 11 Fig. 10.

The bottom 11 is provided with an opening near the rear end of the box. This opening is preferably rectangular as shown in Fig. 7 and for the purpose of closing the opening, four doors have been provided. These doors have been shown most clearly in Fig. 7 and are formed from two pairs, the doors of one pair being designated by reference numeral 66, and the doors forming the other pair being designated by reference numeral 67. Each door is in the shape of a truncated isosceles triangle whose base is provided with curved sections 68 like those employed in ordinary hinges and which cooperate with similar section 69 formed integral with the bottom 11 so as to form a hinge. When the doors are in closed position, they occupy the relative position shown in Fig. 7 and are held in this position by means of locking bars 70 to which reference will be hereinafter made. The doors may be moved from the position shown in Fig. 7 to that shown in Fig. 9, in which position they form a hopper which directs the contents of the box downwardly into another hopper 71 which will be hereinafter more fully described. The bars 70 are preferably identical in shape with the exception that one is somewhat longer than the other. These bars are pivoted at one end so as to rotate in bearings 72 and have their other ends mounted for rotation in bearings 73. The intermediate portions of bars 70 are offset so as to form what may be termed cranks 74. These cranks are offset to such an extent that when they are moved into the vertical position shown in Fig. 9, they will move the doors to closed position and hold them in closed position, and when they are rotated to the full line position, they permit the doors to fold downwardly as shown in Fig. 9 and supports them in proper relation to form the hopper above referred to. Since the doors 67 are to assume the uppermost position when the parts are in the closed position shown in Fig. 7, it is necessary to raise them somewhat faster than the door 66 and for this purpose the cranks 74 have been provided with pins 75. In order to have a smooth upper surface when the doors are closed, doors 67 are provided on their upper surface with triangular pieces 76 which fit against the slanting sides of doors 66 and in order to strengthen the doors 66, the latter have been provided with similar triangular pieces 77, so that when the doors are closed, there is a double thickness of metal over the entire area of the opening. Referring now more particularly to Figs. 1 and 2, it will be seen that each of the bars 70 are provided with a sector-shaped gear 78, which are in mesh and which interconnect the two bars so that they rotate simultaneously in opposite directions and through equal angles. A handle 79 is secured to the outer end of the longer bar 70 in the manner shown in Fig. 2, and this handle is employed for the purpose of rotating the bar 70 so as to move the doors to closed position and to release them when it is desired to unload the material from the box. When the doors are in closed position, the cranks assume a position substantially like that shown in Fig. 9 from which it will be seen that they are moved to a position slightly beyond the vertical so as to prevent accidental movement towards opening position. A stop like that indicated by reference numeral 80 may be provided so as to determine the proper movement towards closing position.

Figure 10:
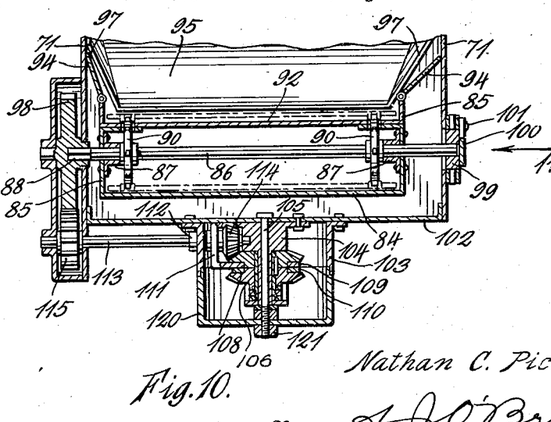
Fig. 10 is a section taken on line 10—10, Fig. 9.

When the doors are open like shown in Fig. 1, the material contained in the box will of course flow downwardly through the hopper formed by the doors and when the scraper is moved rearwardly, the entire load will thus be unloaded. It is obvious that some means must be provided for transporting the material from beneath the hopper to the place where it is to be stored, and for this purpose a conveyor has been provided which will now be described. A circular steel plate 81 is provided with a rectangular central opening and is supported directly underneath the opening in the bottom 1 by means of a plurality of rollers 82 which are secured to the supporting frame work by suitable brackets 83. Secured to the underside of plate 81 is a hopper shaped in the form of a truncated pyramid. This hopper has been indicated as a whole by reference numeral 71. One side of this hopper is provided with an opening through which the conveyor 84 may be inserted into the hopper in the position shown in Fig. 9. The conveyor comprises a rectangular chute formed from steel plates and provided with vertical side members 85. At one end a shaft 86 extends transversely of the conveyor and is mounted for rotation in bearings 87. One end of this shaft has a rectangular section 88, while the other end is cylindrical but slightly longer than the end having the square section. At the other end of the conveyor, a shaft 89 is mounted for rotation about an axis parallel with the axis of shaft 86. Sprocket wheels 90 are secured to these shafts so as to form two aligned pairs over which the sprocket chains 91 may pass. A plate 92 extends from one end of the conveyor to the other and serves to support the sprocket chains and the transverse bars 93 by which they are connected. The inner ends of the sides 85 are provided with hinged projections 94 which are adapted to have their upper edges resting against the sides of the chute 71 in the manner shown in Fig. 10. A curved plate 95 is secured to the inside of chute 71 near the upper end thereof and terminates above the inner end of the conveyor. The lower end of this curved plate is supported on a transverse bar 96 which holds it in place. Plates 95 may also be provided with upwardly extending edges 97. Plate 95 serves to direct the material onto the conveyor in a manner quite apparent from Fig. 9. Since the chute 71 is secured to plate 81, and since the latter is rotatably mounted on the rollers 82, it is apparent that the conveyor may be swung about the axis of the chute 71 through an angle of at least one hundred eighty degrees. The conveyor is so connected with chute 71 that it can be readily detached and the construction whereby this is attained has been illustrated in Fig. 10. From Fig. 10 it will be seen that the square end of shaft 86 extends into a similarly shaped socket in the gear 98, while the other end of shaft 86 projects through an opening in the casting 99 secured to the outer side of chute 71. A hinged handle 100 is mounted for rotation about pivot 101 in the manner shown in Fig. 11, so that it can be swung into position across the end of shaft 86 and can also be moved to such a position that this shaft can be projected outwardly through member 99. From Fig. 10 it will be seen that the parts are so proportioned that the conveyor can be moved towards the right a sufficient distance to remove the square end of shaft 86 from the socket in gear 98 so that the conveyor may be disconnected and transported on the load or underneath the doors.

For the purpose of operating the conveyor the following mechanism has been provided so as to transmit power from shaft 37 to the conveyor. The bottom of the chute 71 is formed by means of a plate 102 to the under surface of which is secured a cylindrical casing 103 and a bearing block 104. Block 104 is provided with a central opening through which a bolt 105 extends. Secured to the bolt below the block 104 is a tubular bearing 106 on which is rotatably mounted two bevel gears 107 of the same size and shape. These gears are connected so as to form a unitary assembly and so as to be held against relative rotation. When gears 107 are in assembled relation, an annular groove 108 is formed in which is located two plates 109 and 110. Plate 109 has its end bent upwardly as indicated by reference numeral 111 and this upwardly extending portion has an opening for the reception of a bearing 112 in which the shaft 113 is journalled. A bevel pinion 114 is connected to the inner end of shaft 113 and meshes with the upper bevel gear 107, so that when gears 107 are rotated shaft 113 will also be rotated. A gear wheel 115 is secured to the outer end of shaft 113 and meshes with gear 98 which will therefore rotate whenever shaft 113 is rotated and when the conveyor is in place this will be operated whenever gear 98 rotates. Plate 110 has an angularly extending portion 116 which carries a bearing 117 in which shaft 118 is mounted for rotation. A bevel pinion 119 is secured to the inner end of shaft 118 and meshes with the lowermost gear wheel 107. This shaft passes through an opening in the wall of a cup-shaped cylindrical member 120, which is secured in place by the bolt 105 to which it is held by means of a nut 121. The other end of shaft 118 extends to the gear casing 122 (Fig. 2) and is journalled in the bearing 123 in the end of this casing. Casing 122 is either formed integral with a downwardly extending bracket 124, or secured to the latter. The upper end of this bracket is secured to the chassis frame by means of bolts 125. A shaft 126 is journalled in bearing 127 of casing 122 and has its upper end journalled in bearing 128 of the gear case 129. Shaft 37 is provided with a bevel gear 130 which is located inside of casing 129 and this meshes with the bevel gear 131 which is secured to the upper end of shaft 126. Secured to the lower end of shaft 126 is another bevel gear 132 which meshes with a gear 133 located within the casing 122. Gear 133 is provided with an elongated hub 134 whose outer end is journalled in bearing 135, which is secured to or forms part of casing 122. A bolt 136 extends through an axial opening in hub 134 and has a threaded connection with an axial opening in shaft 118. The inner end of shaft 118 is provided with a circular head 137, while the adjacent end of gear 133 is provided with a similar circular hub or projection which has been indicated by reference numeral 138. A circular wooden block 139 is located between the gear and the circular head of shaft 118 and forms a friction clutch disk through which power is transmitted from the gear to the shaft. Ring 140 may enclose the hub 138 and the disk 139 so as to align the parts and to remove undue strains from bolt 136. A washer 141 is located on the outer end of bolt 136 and is separated from the head of the bolt by means of a spring washer 142. By adjusting the tension of the bolt the friction clutch can be adjusted so as to transmit the necessary amount of power for operating the conveyor and so as to permit it to slip and prevent breakage if, for any reason, the conveyor should become stuck. It is apparent that the cup-shaped member 120 can, of course, not rotate about the axis of bolt 105 because shaft 118 extends through the cylindrical wall and holds it against rotation. Chute 71 and part 103 with which the conveyor 85 is connected, can, of course be rotated so as to swing it to any position within an arc of one hundred eighty degrees.

It is often necessary to carry loads intended for different customers, especially in handling coal and when this occurs a partition 143 is placed inside of the box and the coal is loaded into the compartment between this partition and the end of the box. This coal, of course, will be located directly above the opening in the bottom and will be the first to be delivered. The partition is held in place by means of hinges like those shown in Fig. 12 and indicated by reference numeral 144. These hinges are placed on the front side of the partition and will prevent the partition from moving forwardly but permit it to move rearwardly so that it is possible to employ several of these partitions and at the same time not interfere with the unloading operation as the partitions will merely slide rearwardly with the load and in this manner a single load can readily be divided into a plurality of parts each comprising only a portion of the total load.

In the drawing the box has been shown more or less diagrammatically, but it is my intention to have the rear end of the box hinged so that it can swing outwardly and it is then possible to unload the box without opening the doors in the bottom and this mode of unloading can be employed where sand, gravel and dirt is to be unloaded and which does not require to be conveyed to any distance from the truck. The conveyor is, of course, used when unloading coal into buildings and whenever the material unloaded is to be deposited at some distance from the truck. The conveyor can, of course, be made as long as desired and it is also possible to employ several sections which are connected together and operated one from the other and in this manner the material can be conveyed a considerable distance from the truck.

The several gears shown are all enclosed in housings which can be packed with grease so that the gears will always be properly lubricated.

The construction shown on the drawings and described herein has been found to be well suited for the purpose but it is, of course, possible to obtain the same results with specifically different means, which, however, will merely be the mechanical equivalents. For example, in some places sprocket chains may be employed instead of gears. The specific construction of the doors can, of course, be altered as it is possible to employ only two doors instead of the four shown, but with the four doors constructed in the manner illustrated and described some advantages are obtained which could not be had if only two doors were used. The construction by means of which the conveyor can be rotated about a vertical axis is considered highly important, as by means of this adjustment, the conveyer can be very conveniently turned to the position most suitable for the delivery of the material. It is, of course, possible to unload without having this adjustment and applicant therefore considers that his invention is not limited to this adjustable feature.

I want to call attention at this point to the construction of the scraper of which a cross section is shown in Fig. 2. From this figure it will be seen that the lower part of the plate is inclined forwardly, as indicated by numeral 22, and therefore when the scraper is moved rearwardly, it has a tendency to raise a portion of the load because this inclined portion of the plate extends underneath the load in a manner quite obvious from the drawing. The weight of the material that is supported by the inclined part 22 also tends to force the forward edge of the plate downwardly against the bottom of the box so as to hold it in contact with the bottom and thereby produce a better cleaning effect than could be produced if the plate were not held against the bottom by the weight of the material as above described.

When the mechanism above described is to be used for handling grain, dry sand and similar materials, it is necessary to have a close fit between the ends of the scraper and the sides of the box so as to prevent the material from flowing past the scraper. For the purpose of making a tight joint between the ends of the scraper and the sides of the box, a leather strip 21ᵃ has been secured to the outer surface of each angle 24 in the manner shown in Fig. 13. This strip, when pressed against the sides of the box forms a tight seal that prevents material from flowing past the scraper.

Although the structure described is intended more particularly for unloading material, it is, of course, possible to attach a cable to the connecting link 25 and attach the other end of this cable to some article that is to be loaded onto the truck. The mechanism is then put in operation for the purpose of moving the scraper forwardly, thereby exerting a pull on the cable which can be utilized for moving material forwardly in the truck and for lifting it from the ground and depositing it in the truck. This has not been illustrated as it is merely an inherent function of the construction shown.

In the above description, the term truck has been used and the device has been illustrated and described in connection with an automobile truck of the type employed for hauling heavy materials, such as sand, gravel and coal. I want it understood, however, that the invention is not limited to this particular kind of a truck, but can be used in connection with any form of vehicle, regardless of the manner in which it is supported, and one use to which I intend to put my mechanism is in connection with railway cars for the purpose of unloading freight cars in a similar manner to that described above. The power for use in unloading freight cars may be derived from an engine or motor attached to the car or else power can be supplied by a prime mover such as an internal combustion engine, or an electric motor, which is kept at the place where the unloading is to be done.

From the above description it will be apparent that I have produced a mechanism which can be incorporated with a vehicle of any type such as an automotive truck, or a freight car, and by means of which the load can be quickly unloaded and deposited at any desired place and which when employed in connection with an automobile utilizes the engine which drives the automobile for the purpose of loading and unloading.

Having described the invention what is claimed as new is:

1. A dump truck having an engine, a box whose bottom is provided with an opening near the rear end thereof, a plurality of doors hinged to the bottom adjacent the edge of the opening, means for moving the doors to closed position, means for holding the doors in position to form a chute when in open position, means operated by the engine for moving the material along the box towards the opening, a conveyor located underneath the opening and means interposed between the engine and the conveyor for operating the conveyor.

2. A dump truck having an engine, a box whose bottom is provided with an opening near the rear end thereof, a plurality of doors hinged to the bottom adjacent the edge of the opening, means for moving the doors to closed position, means for holding the doors in position to form a chute when in open position, a scraper extending entirely across the box and adapted to be moved therealong, means interposed between the scraper and the engine for moving the scraper by power from the engine, means for automatically stopping the movement of the scraper at the ends of its travel, a conveyor located underneath the opening in the bottom and means interposed between the engine and the conveyor for operating the latter by power from the engine.

3. In a truck having a box provided with a rectangular opening in the floor near the rear end thereof, means for moving material from the front end of the box towards the opening, a door attached to each of the four sides of the openings, each door having the shape of a truncated isosceles triangle and having its base hinged to the floor so that it can be moved to and from opening closing position, said doors when in open position forming a chute having the form of a truncated pyramid and means for holding the doors in a predetermined position when open and for moving the doors to closed position and latching them in closed position.

4. In a truck having an engine and a box provided with a rectangular opening in the floor of the box near the rear end of the box, means for moving material from the front end of the box towards the opening, a door attached to each of the four sides of the opening, each door having the shape of a truncated isosceles triangle and having its base hinged to the floor so that it can be moved to and from opening closing position, said doors when in open position forming a chute having the form of a truncated pyramid, means for holding the doors in a predetermined position when open and for moving the doors to closed position and latching them in closed position, a conveyor located underneath the opening in the floor and means interposed between the conveyor and the engine for operating the conveyor by means of power derived from the engine.

5. In a truck having an engine and a box provided with a rectangular opening in the floor of the box near the rear end of the box, means for moving material from the front end of the box towards the opening, a door attached to each of the four sides of the opening, each door having the shape of a truncated isosceles triangle and having its base hinged to the floor so that it can be moved to and from opening closing position, said doors when in open position forming a chute having the form of a truncated pyramid, means for holding the doors in a predetermined position when open and for moving the doors to closed position and latching them in closed position, a conveyor located underneath the opening in the floor, means for guiding material onto the conveyor and means interposed between the conveyor and the engine for operating the conveyor by means of power derived from the engine.

6. In a truck having a box provided with a rectangular opening in its bottom near the rear end thereof, means for closing said opening, said means comprising a door hinged to each of the four sides of the opening, two of said doors having the shape of a truncated isosceles triangle, means for opening and closing the doors comprising two rods extending across the opening underneath the doors, means for pivotally securing the rods to the bottom of the box, each of said rods having an elongated central portion against which the doors may rest, means for interconnecting the rods so that they will rotate at the same rate in opposite direction and a handle secured to one of said rods.

In testimony whereof I affix my signature.

NATHAN C. PICKARD.